US 10,177,577 B2

(12) United States Patent
Kanbe et al.

(10) Patent No.: US 10,177,577 B2
(45) Date of Patent: Jan. 8, 2019

(54) STORAGE BATTERY DEVICE

(71) Applicant: Kabushiki Kaisha Toshiba, Tokyo (JP)

(72) Inventors: Fuyuki Kanbe, Tokyo (JP); Kazuto Kuroda, Tokyo (JP); Shinichiro Kosugi, Kanagawa (JP); Masahiro Sekino, Tokyo (JP); Minoru Gyoda, Saitama (JP); Yosuke Saeki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 337 days.

(21) Appl. No.: 14/911,091

(22) PCT Filed: Feb. 10, 2014

(86) PCT No.: PCT/JP2014/053084
§ 371 (c)(1),
(2) Date: Feb. 9, 2016

(87) PCT Pub. No.: WO2015/019633
PCT Pub. Date: Feb. 12, 2015

(65) Prior Publication Data
US 2016/0181836 A1    Jun. 23, 2016

(30) Foreign Application Priority Data
Aug. 9, 2013 (JP) ................. 2013-166758

(51) Int. Cl.
*H02J 7/00* (2006.01)
*H02J 7/02* (2016.01)

(52) U.S. Cl.
CPC .............. *H02J 7/0013* (2013.01); *H02J 7/00* (2013.01); *H02J 7/0029* (2013.01);
(Continued)

(58) Field of Classification Search
CPC ....... H02J 7/0013; H02J 7/0029; H02J 7/0068
(Continued)

(56) References Cited

U.S. PATENT DOCUMENTS

| 5,583,384 A | 12/1996 | Henry |
| 6,313,610 B1 | 11/2001 | Korsunsky |

(Continued)

FOREIGN PATENT DOCUMENTS

| JP | H08-154341 A | 11/1996 |
| JP | H08-308135 A | 11/1996 |
| JP | 2009-277647 A | 11/2009 |

OTHER PUBLICATIONS

International Search Report and Written Opinion issued in related PCT Application No. PCT/JP2014/053084 dated Mar. 18, 2014, 8 pages (with translation of search report).

(Continued)

*Primary Examiner* — Edward Tso
*Assistant Examiner* — Aaron Piggush
(74) *Attorney, Agent, or Firm* — Baker Botts L.L.P.

(57) ABSTRACT

According to one embodiment, a storage battery device includes a battery group, a charge-and-discharge control FET unit, and a drive controller. The battery group includes a plurality of battery cells connected in series. The charge-and-discharge control FET unit is connected to a low potential side of the battery group and includes at least a pair of N-channel MOSFETs source terminals of which are back-to-back connected. The drive controller outputs a drive control signal to a gate terminal of the respective N-channel MOSFETs included in the charge-and-discharge control FET unit. The drive control signal is generated based on a potential level of the source terminals.

4 Claims, 5 Drawing Sheets

(52) U.S. Cl.
CPC ............ *H02J 7/0068* (2013.01); *H02J 7/022* (2013.01); *H02J 7/027* (2013.01); *H02J 2007/0037* (2013.01)

(58) Field of Classification Search
USPC .................................. 320/118, 134, 136, 163
See application file for complete search history.

(56) References Cited

U.S. PATENT DOCUMENTS

| | | | | |
|---|---|---|---|---|
| 7,095,212 B2 * | 8/2006 | Sudo | ......................... | H02J 7/00 320/136 |
| 2009/0289605 A1 * | 11/2009 | Takahashi | ................. | H02J 7/00 320/163 |
| 2012/0249087 A1 | 10/2012 | Kimura | | |
| 2013/0200847 A1 * | 8/2013 | Kurokawa | ............ | H02J 7/0031 320/112 |

OTHER PUBLICATIONS

Search Report issued in related European Application No. 14834061.5, dated Feb. 21, 2017 (8 pages).

\* cited by examiner

STORAGE BATTERY DEVICE

CROSS-REFERENCE TO RELATED APPLICATIONS

This application is national stage application of International Application No. PCT/JP2014/053084, filed Feb. 10, 2014, which designates the United States, incorporated herein by reference, and which claims the benefit of priority from Japanese Patent Application No. 2013-166758, filed Aug. 9, 2013, the entire contents of both applications are incorporated herein by reference.

FIELD

Embodiments described herein relate generally to a storage battery device.

BACKGROUND

Conventionally, the lithium ion battery (LIB) that is a storage battery used as a single cell has been low in voltage when used for industrial equipment and on-vehicle equipment.

For this reason, it has been required to form a battery pack by connecting many cells in series.

In order to respond to a demand for large electric power supply, a demand for higher capacity has been increasing in systems using a battery pack as a drive power supply or an auxiliary power supply for the purpose of higher performance and a longer available time.

Examples of a technique therefor include a battery pack device in which a battery pack is configured by connecting many batteries in series to configure battery groups and connecting the battery groups in parallel. In this case, in order to facilitate handling of batteries, a plurality of batteries may be connected in parallel and in series to be configured as a modularized storage battery device.

When a battery pack system is configured using a plurality of modularized storage battery devices, N-channel MOSFETs (a discharge control N-channel MOSFET and a charge control N-channel MOSFET) the drains of which are back-to-back connected (commonly connected) to a low potential side of a battery group included in each of the storage battery devices are provided to perform discharge control and charge control, and the battery groups included in the modularized storage battery devices are used by connecting them in series, the following problem may occur.

If the discharge control N-channel MOSFET that performs discharge control during discharging is turned off to be interrupted, for example, a reverse voltage is applied via a source terminal of the charge control N-channel MOSFET and a resistor for stabilizing the operation of the charge control N-channel MOSFET provided in between the source terminal and a gate terminal to an output terminal of an FET gate driver that drives the charge control N-channel MOSFET through a counter electromotive force, which may destroy the circuit of the FET gate driver.

If the charge control N-channel MOSFET that performs charge control during charging is turned off to be interrupted, an overvoltage caused by a counter electromotive force occurs, which may destroy a MOSFET control circuit.

DETAILED DESCRIPTION

In general, according to one embodiment, a storage battery device comprises a battery group, a charge-and-discharge control FET unit, and a drive controller. The battery group includes a plurality of battery cells connected in series. The charge-and-discharge control FET unit is connected to a low potential side of the battery group and includes at least a pair of N-channel MOSFETs source terminals of which are back-to-back connected. The drive controller outputs a drive control signal to a gate terminal of the respective N-channel MOSFETs included in the charge-and-discharge control FET unit. The drive control signal is generated based on a potential level of the source terminals.

The following describes embodiments with reference to the drawings.

[1] First Embodiment

Figure 1:
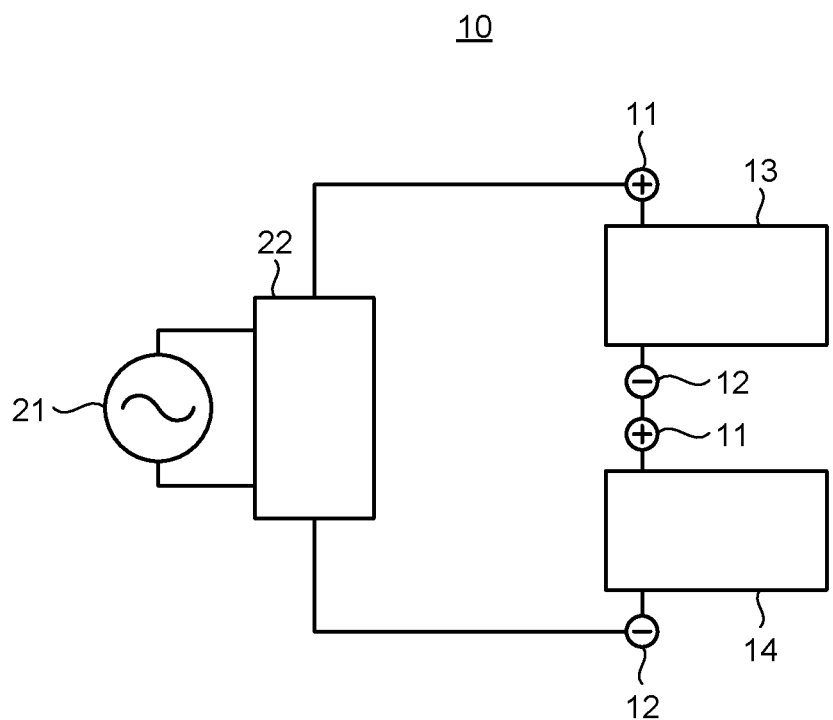
FIG. 1 is a schematic block diagram of a battery pack system in a charging state according to embodiments.

FIG. 1 is a schematic block diagram of a battery pack system in a charging state according to an embodiment.

In FIG. 1, a case in which two battery modules are connected in series will be described.

This battery pack system 10 includes a battery module 13 including a high potential side power supply terminal 11 and a low potential side power supply terminal 12 and a battery module 14 having the same configuration as the battery module 13, in which the high potential side power supply terminal 11 is connected to the low potential side power supply terminal 12 of the battery module 13.

In the charging state, a charging device 22 connected to a commercial AC power supply 21 is connected to between the high potential side power supply terminal 11 of the battery module 13 and the low potential side power supply terminal 12 of the battery module 14. During discharging, a load is connected thereto in place of the charging device 22.

The following describes a configuration of the battery module.

The battery module 13 and the battery module 14 have the same configuration as described above, and the following describes the battery module 13 as an example.

Figure 2:
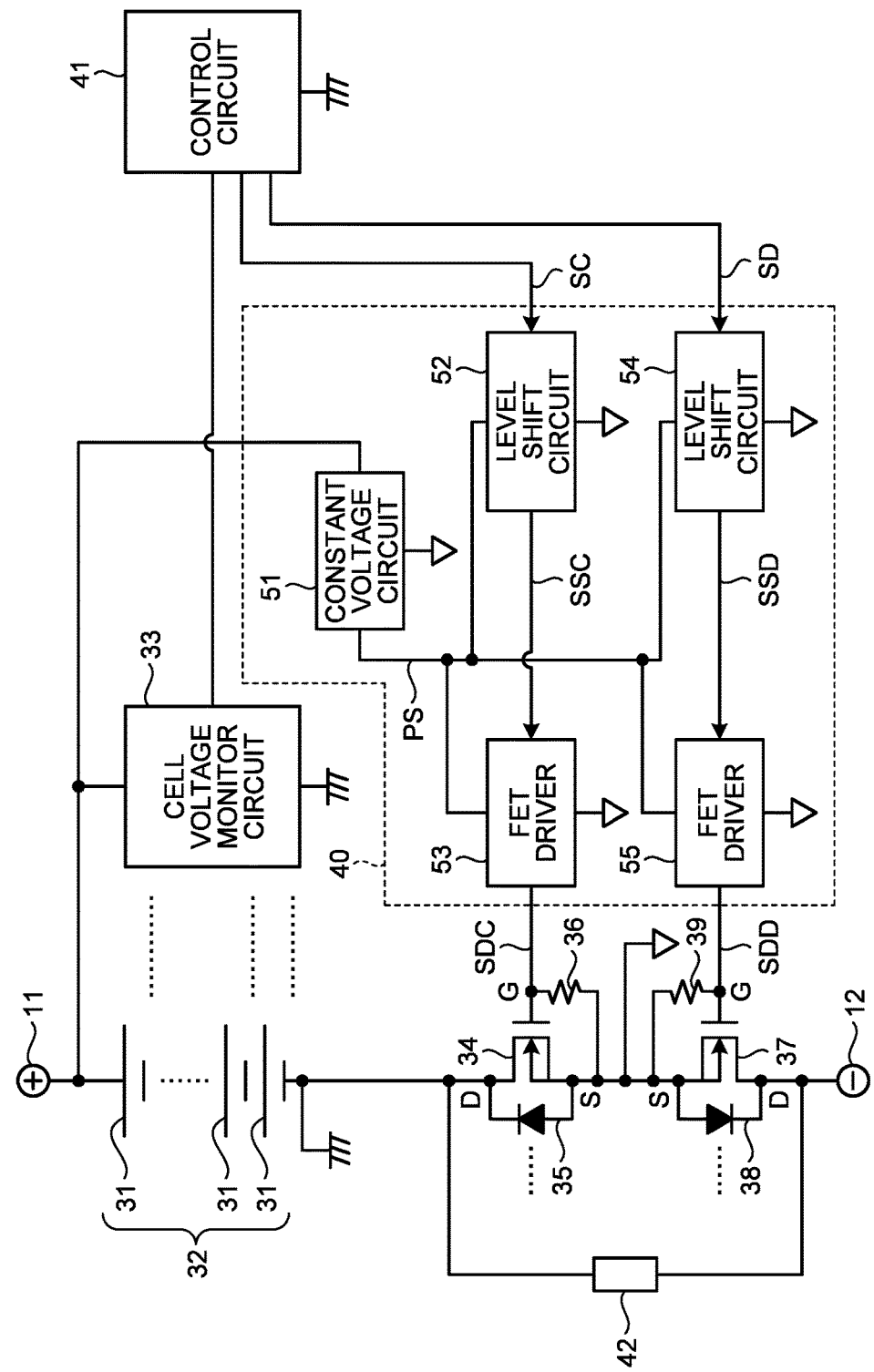
FIG. 2 is a schematic block diagram of a battery module according to a first embodiment.

FIG. 2 is a schematic block diagram of a battery module according to a first embodiment.

The battery module 13 according to the first embodiment includes a storage battery unit 32 one end of which is connected to the high potential side power supply terminal 11 and that includes a plurality of storage battery cells 31 connected in series, a cell voltage monitor circuit 33 that monitors the voltages of the respective storage battery cells 31 included in the storage battery unit 32, a charge control FET (a charge control N-channel MOSFET) 34 the drain terminal of which is connected to a low potential side of the storage battery unit 32, a diode 35 that is a parasitic diode present in between the drain terminal and a source terminal of the charge control FET 34, and an operation stabilizing resistor 36 that is connected to between the source terminal and a gate terminal of the charge control FET 34 and stabilizes a potential difference level between the source terminal and the gate terminal of the charge control FET 34 to stabilize the operation of the charge control FET 34.

The battery module 13 further includes a discharge control FET (a discharge control N-channel MOSFET) 37 the source terminal of which is connected to the source terminal of the charge control FET 34, a diode 38 that is a parasitic diode present in between a drain terminal and the source terminal of the discharge control FET 37, an operation stabilizing resistor 39 that is connected to between the source terminal and a gate terminal of the discharge control FET 37 and stabilizes a potential difference level between the source terminal and the gate terminal of the discharge control FET 37 to stabilize the operation of the discharge control FET 37, a drive controller 40 that operates based on a source potential level of the charge control FET 34 and the discharge control FET 37 (hereinafter, simply referred to as based on a source potential level) and performs drive control of the charge control FET 34 and the discharge control FET 37, a control circuit 41 that controls the entire battery module 13, and a snubber circuit 42 for overvoltage protection connected in parallel with the charge control FET 34 and the discharge control FET 37.

In the above configuration, FIG. 2 illustrates one charge control FET 34 and one discharge control FET 37 for easy understanding. However, in practice, the charge control FET 34 and the discharge control FET 37 each include a plurality of N-channel MOSFETs connected in parallel as described below (refer to FIG. 3). Consequently, a plurality of diodes 35 and a plurality of diodes 38 are present, and a plurality of operation stabilizing resistors 36 and a plurality of operation stabilizing resistors 39 are provided in practice.

In the example of the first embodiment, when the charge control FET 34 and the discharge control FET 37 are interrupted, owing to an operating timing lag, the voltages of all the storage battery cells 31 connected in series are applied to one FET that is the last to be an on-state, and a current also passes therethrough.

Consequently, the respective FETs 34 and 37 are configured so as to have voltage resistance characteristics and current resistance characteristics that enable one FET to pass a current having passed through all the FETs 34 and 37 connected in parallel and in series.

The drive controller 40 includes a constant voltage circuit 51 that supplies drive power (a drive power supply) having a certain constant voltage based on the source potential level to the elements of the drive controller 40, a level shift circuit 52 that performs a level shift operation based on a charge control signal SC based on a power supply potential level received from the control circuit 41 and generates and outputs a charge control signal SSC based on the source potential level, an FET driver 53 that generates and outputs a charge drive control signal SDC based on the source potential level that drives the charge control FET 34 based on the input charge control signal SSC, a level shift circuit 54 that performs a level shift operation based on a discharge control signal SD based on the power supply potential level received from the control circuit 41 and generates and outputs a discharge control signal SSD based on the source potential level, and an FET driver 55 that generates and outputs a discharge drive control signal SDD based on the source potential level that drives the discharge control FET 37 based on the input discharge control signal SSD.

Figure 3:
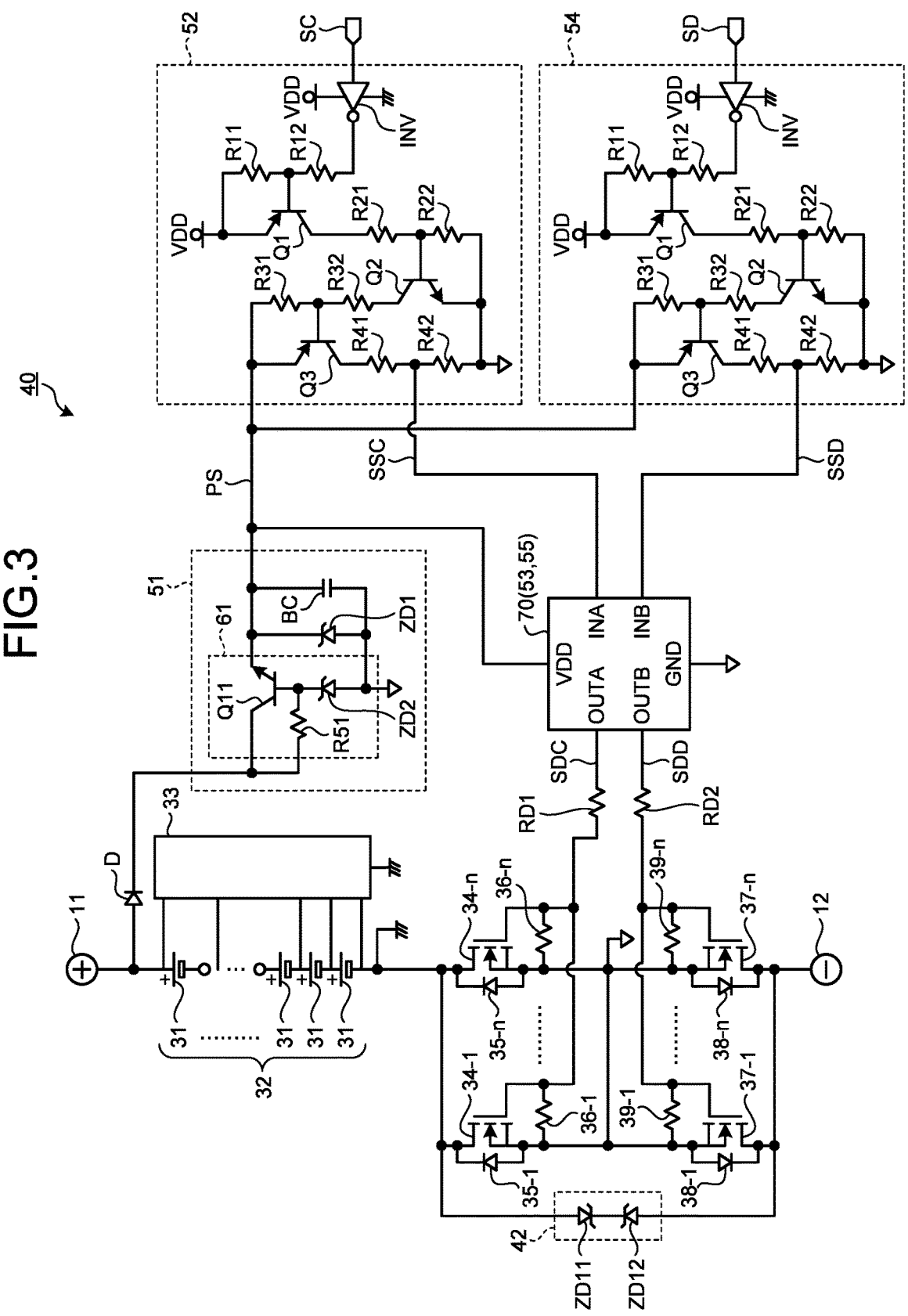
FIG. 3 is a detailed circuit explanatory diagram according to the first embodiment.

FIG. 3 is a detailed circuit explanatory diagram according to the first embodiment.

As illustrated in FIG. 3, the constant voltage circuit 51 broadly includes a constant voltage generator 61 that generates a constant voltage power supply based on the source potential level, a Zener diode ZD1 that is connected in parallel with the constant voltage generator 61 and clamps an output voltage of the constant voltage generator 61 to a desired constant voltage, and a bypass capacitor BC that is connected in parallel with the Zener diode ZD1 and performs relaxation of voltage fluctuations caused by source potential fluctuations and relaxation of voltage fluctuations at the time of gate signal switching.

The constant voltage generator 61 includes a transistor Q11 the collector terminal of which is connected to a high potential side of the storage battery unit 32 via a diode D and that is configured as an emitter follower (collector-grounded) circuit by a resistor R51 and a Zener diode ZD2 the cathode terminal of which is connected to a base terminal of the transistor Q11, the anode terminal of which is at the source potential level, and that stabilizes a base voltage of the transistor Q11.

With the above configuration, a constant voltage power supply PS based on the source potential level generated by the constant voltage circuit 51 is supplied to the level shift circuit 52 and the level shift circuit 54.

The following describes the level shift circuit 52 and the level shift circuit 54. The level shift circuit 52 and the level shift circuit 54 have the same configuration, and the following describes the level shift circuit 52 as an example.

The level shift circuit 52 includes an inverter INV that receives the charge control signal SC based on the power supply potential level via an input terminal and inverts and outputs the charge control signal SC, resistors R11 and R12 that, when the inverter INV receives the charge control signal SC (="H") that instructs charging and the output of the inverter INV becomes an "L" level (ground level), function as a voltage dividing circuit that divides the voltage of a high potential side power supply VDD, a transistor Q1 that is turned on by the application of the voltage of the high potential side power supply VDD divided by the resistors R11 and R12 to the base terminal thereof, and resistors R21 and R22 that, when the transistor Q1 is turned on, function as a voltage dividing circuit that divides the voltage of the high potential side power supply VDD at a certain voltage division ratio.

In this case, the high potential side power supply VDD is generated based on power supplied from the storage battery unit 32 by a constant voltage power supply circuit (not illustrated). The voltage of the high potential side power supply VDD is 3.3 [V], for example.

The level shift circuit 52 further includes a transistor Q2 that is turned on by the application of the voltage of the high potential side power supply VDD divided by the resistors R21 and R22 to the base terminal thereof, resistors R31 and R32 that, when the transistor Q2 is turned on, function as a voltage dividing circuit that divides the voltage of the constant voltage power supply PS supplied from the constant voltage circuit 51 at a certain voltage division ratio, a transistor Q3 that is turned on by the application of the voltage of the constant voltage power supply PS divided by the resistors R31 and R32 to the base terminal thereof, and resistors R41 and R42 that, when the transistor Q3 is turned on, function as a voltage dividing circuit that divides the voltage of the constant voltage power supply PS supplied from the constant voltage circuit 51 at a certain voltage division ratio and outputs the divided voltage of the constant voltage power supply PS as the charge control signal SSC.

As illustrated in FIG. 3, the FET driver 53 and the FET driver 55 are integral with each other as one IC 70.

The charge control signal SSC is input to a first input terminal INA of the IC 70 from the level shift circuit 52, and a charge drive control signal SDC based on the source potential level is output from a first output terminal OUTA via a damping resistor RD1 that prevents vibration of this charge drive control signal (FET gate signal). In other words, the IC 70 functions as the FET driver 53.

Similarly, the discharge control signal SSD is input to a second input terminal INB of the IC 70 from the level shift circuit 54, and a discharge drive control signal SDD based on the source potential level is output from a second output terminal OUTB via a damping resistor RD2 that prevents vibration of this discharge drive control signal (FET gate signal). In other words, the IC 70 functions as the FET driver 55.

Connected to the low potential side of the storage battery unit 32 are n charge control FETs (charge control N-channel MOSFETs) 34-1 to 34-n the drain terminals of which are connected to each other, diodes 35-1 to 35-n that are parasitic diodes present in between respective drain terminals and respective source terminals of the charge control FETs 34-1 to 34-n, and operation stabilizing resistors 36-1 to 36-n that are connected to between the respective source terminals and respective gate terminals of the charge control FETs 34-1 to 34-n and stabilize potential difference levels between the respective source terminals and the respective gate terminals of the charge control FETs 34-1 to 34-n to stabilize the operation of the charge control FETs 34-1 to 34-n.

Connected to the respective charge control FETs 34-1 to 34-n are discharge control FETs (discharge control N-channel MOSFETs) 37-1 to 37-n the source terminals of which are connected to the source terminals of the charge control FETs 34-1 to 34-n, diodes 38-1 to 38-n that are parasitic diodes present in between respective drain terminals and the respective source terminals of the discharge control FETs 37-1 to 37-n, and operation stabilizing resistors 39-1 to 39-n that are connected to between the respective source terminals and respective gate terminals of the discharge control FETs 37-1 to 37-n and stabilize potential difference levels between the respective source terminals and the respective gate terminals of the discharge control FETs 37-1 to 37-n to stabilize the operation of the discharge control FETs 37-1 to 37-n.

The snubber circuit 42 includes a TVS diode ZD11 and a TVS diode ZD12 the anode terminals of which are commonly connected and that are connected in series to function as surge absorbing diodes in order to prevent an overvoltage in both directions of a current during charging and a current during discharging. Although the TVS diodes are used as the surge absorbing diodes in the present embodiment, normal Zener diodes, other overvoltage protection elements, or an overvoltage protection circuit can also be used.

The following describes the operation of the first embodiment.

In a circuit configuration in which the source terminals are back-to-back connected, a problem similar to that in a conventional case in which the drain terminals are back-to-back connected occurs during charging. Consequently, the following describes operation during charging.

First, the constant voltage power supply PS based on the source potential level generated by the constant voltage circuit 51 is supplied to the level shift circuit 52 and the level shift circuit 54.

When performing charging concurrently therewith, the charge control signal SC of the "H" level based on the power supply potential level is input to an input terminal of the level shift circuit 52, and the discharge control signal SD of the "H" level" based on the power supply potential level is input to an input terminal of the level shift circuit 54 by the control circuit 41.

As a result of this operation, the inverter INV of the level shift circuit 52 inverts the charge control signal SC to output the signal of the "L" level.

With this operation, the resistors R11 and R12 divide the voltage of the high potential side power supply VDD, and the divided voltage is applied to a base terminal of the transistor Q1, whereby the transistor Q1 is turned on.

Furthermore, the resistors R21 and R22 divide the voltage of the high potential side power supply VDD, and the divided voltage is applied to a base terminal of the transistor Q2, whereby the transistor Q2 is turned on.

The resistors R31 and R32 divide the voltage of the constant voltage power supply PS, and the divided voltage is applied to a base terminal of the transistor Q3, whereby the transistor Q3 is turned on.

As a result of this operation, the resistors R41 and R42 divide the voltage of the constant voltage power supply PS to generate the charge control signal SSC of the "H" level based on the source potential level and outputs the charge control signal SSC to the first input terminal INA of the IC 70.

By operation similar to that of the level shift circuit 52, the resistors R41 and R42 of the level shift circuit 54 divide the voltage of the constant voltage power supply PS and output the discharge control signal SSD of the "H" level based on the source potential level to the second input terminal INB of the IC 70.

As a result of this operation, the charge drive control signal SDC of the "H" level based on the source potential level is output from the first output terminal OUTA of the IC 70, by which the IC 70 functions as the FET driver 53.

Similarly, the discharge drive control signal SDD of the "H" level based on the source potential level is output from the second output terminal OUTB of the IC 70, by which the IC 70 functions as the FET driver 55.

As a result of this operation, the charge control FETs 34-1 to 34-n and the discharge control FETs 37-1 to 37-n are successively turned on, whereby a charging current is supplied from the charging device 22 connected to the commercial AC power supply 21 to the storage battery cells 31 included in the storage battery unit 32 to charge the storage battery unit 32.

During charging, when an overvoltage is detected by the cell voltage monitor circuit 33 that monitors the voltages of the respective storage battery cells 31 included in the storage battery unit 32, the fact is reported to the control circuit 41, and the charge control signal SC of the "L" level based on the power supply potential level is input to the input terminal of the level shift circuit 52 by the control circuit 41.

As a result of this operation, the inverter INV of the level shift circuit 52 inverts the charge control signal SC to output the signal of the "H" level.

When the charge control signal SC becomes the "H" level, the transistor Q1 is turned off, and subsequently, the transistor Q2 and the transistor Q3 are turned off.

When the transistor Q3 is turned off, the level shift circuit 52 generates the charge control signal SSC of the "L" level based on the source potential level and outputs the charge control signal SSC to the first input terminal INA of the IC 70, and the charge drive control signal SDC of the "L" level based on the source potential level is output from the first output terminal OUTA of the IC 70.

Consequently, the charge control FETs 34-1 to 34-n are successively turned off, all the charge control FETs 34-1 to 34-*n* are turned off, a closed circuit for charging is interrupted, charging is stopped, and the storage battery unit 32 including the storage battery cells 31 is protected from overcharge.

In this situation, although a positive overvoltage and a negative overvoltage are generated at the high potential side power supply terminal 11 and at the low potential side power supply terminal 12, respectively, caused by a counter electromotive force due to the interruption of the charging current, the level shift circuits 52 and 54 and the IC 70 are protected by the constant voltage circuit 51 based on the source potential level.

During discharging, when an abnormal voltage is detected by the cell voltage monitor circuit 33 that monitors the voltages of the respective storage battery cells 31 included in the storage battery unit 32, the fact is reported to the control circuit 41, and the discharge control signal SSD of the "L" level based on the power supply potential level is input to the second input terminal INB of the IC 70 via the level shift circuit 54 by the control circuit 41.

As a result of this operation, the discharge drive control signal SDD of the "L" level based on the source potential level is output from the second output terminal OUTB of the IC 70, the discharge control FETs 37-1 to 37-*n* are successively turned off, and discharging (power supply) is interrupted from the storage battery unit 32 to a load (not illustrated).

In this situation, although a negative reverse voltage and a positive reverse voltage are generated at the high potential side power supply terminal 11 and at the low potential side power supply terminal 12, respectively, caused by a counter electromotive force due to the interruption of a discharging current, a reverse voltage is applied to the second output terminal OUTB of the IC 70 as the output terminal of the FET driver 55 via an operation stabilizing resistor 39-*x*, whereby the circuit is not destroyed.

[2] Second Embodiment

Figure 4:
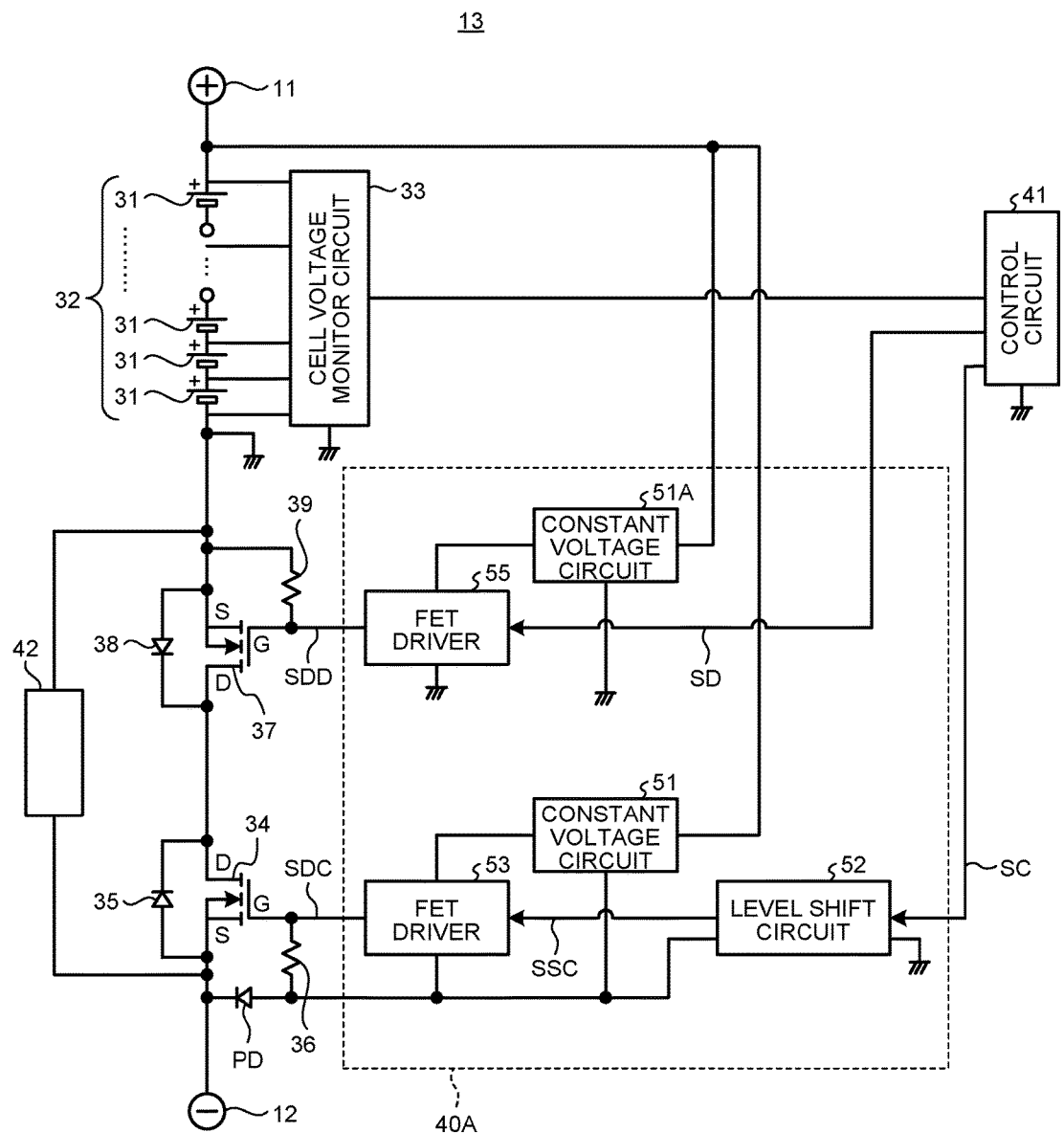
FIG. 4 is a schematic block diagram of a battery module according to a second embodiment.

FIG. 4 is a schematic block diagram of a battery module according to a second embodiment.

The battery module 13 according to the second embodiment includes the storage battery unit 32 one end of which is connected to the high potential side power supply terminal 11 and that includes the storage battery cells 31 connected in series, the cell voltage monitor circuit 33 that monitors the voltages of the respective storage battery cells 31 included in the storage battery unit 32, the charge control FET (the charge control N-channel MOSFET) 34 the source terminal of which is connected to the low potential side power supply terminal 12, the diode 35 that is the parasitic diode present in between the drain terminal and the source terminal of the charge control FET 34, the operation stabilizing resistor 36 that is connected to between the source terminal and the gate terminal of the charge control FET 34 and stabilizes the potential difference level between the source terminal and the gate terminal of the charge control FET 34 to stabilize the operation of the charge control FET 34, and a protective diode PD that is connected to between the operation stabilizing resistor 36 and the low potential side power supply terminal 12 of the storage battery unit 32 and protects the circuit from a reverse voltage caused by a counter electromotive force at the time of discharge interruption.

In the charge control FET 34, the source terminal is connected to the low potential side power supply terminal 12, and the charge control FET 34 is an N-channel MOSFET which has the possibility that the potential of the source terminal varies with respect to a power supply potential.

The battery module 13 further includes the discharge control FET (the discharge control N-channel MOSFET) 37 the source terminal of which is connected to a negative side of the storage battery unit 32 and the drain terminal of which is connected to the drain terminal of the charge control FET 34, the diode 38 that is the parasitic diode present in between the drain terminal and the source terminal of the discharge control FET 37, the operation stabilizing resistor 39 that is connected to between the source terminal and the gate terminal of the discharge control FET 37 and stabilizes the potential difference level between the source terminal and the gate terminal of the discharge control FET 37 to stabilize the operation of the discharge control FET 37, a drive controller 40A that performs drive control of the charge control FET 34 and the discharge control FET 37, the control circuit 41 that controls the entire battery module 13, and the snubber circuit 42 for overvoltage protection connected in parallel with the charge control FET 34 and the discharge control FET 37.

In the above configuration, FIG. 4 illustrates one charge control FET 34 and one discharge control FET 37 for easy understanding. However, in practice, the charge control FET 34 and the discharge control FET 37 each include a plurality of N-channel MOSFETs connected in parallel similarly to the first embodiment as described below (refer to FIG. 5). Consequently, a plurality of diodes 35 and a plurality of diodes 38 are present, and a plurality of operation stabilizing resistors 36 and a plurality of operation stabilizing resistors 39 are provided in practice.

In the example of the embodiment, when the charge control FET 34 and the discharge control FET 37 are interrupted, owing to an operating timing lag, the voltages of all the storage battery cells 31 connected in series are applied to one FET that is the last to be an on-state, and a current also passes therethrough.

Consequently, the respective FETs 34 and 37 are configured so as to have voltage resistance characteristics and current resistance characteristics that enable one FET to pass a current having passed through all the FETs 34 and 37 connected in parallel and in series.

The drive controller 40A includes the constant voltage circuit 51 that supplies drive power (a drive power supply) having a certain constant voltage at a potential level of the low potential side power supply terminal 12 of the storage battery unit 32 to the FET driver 53, the level shift circuit 52 that performs the level shift operation based on the charge control signal SC based on the power supply potential received from the control circuit 41 and generates and outputs the charge control signal SSC based on the source potential level of the FET 34, the FET driver 53 that generates and outputs the charge drive control signal SDC based on the source potential level of the FET 34 that drives the charge control FET 34 based on the charge control signal SSC based on the source potential level of the FET 34 received from the level shift circuit 52, a constant voltage circuit 51A that supplies drive power (a drive power supply) having a certain constant voltage based on the power supply potential level to the FET driver 55, and the FET driver 55 that generates and outputs the discharge drive control signal SDD based on the power supply potential level that drives the discharge control FET 37 on the basis of the discharge control signal SD based on the power supply potential level received from the control circuit 41.

Figure 5:
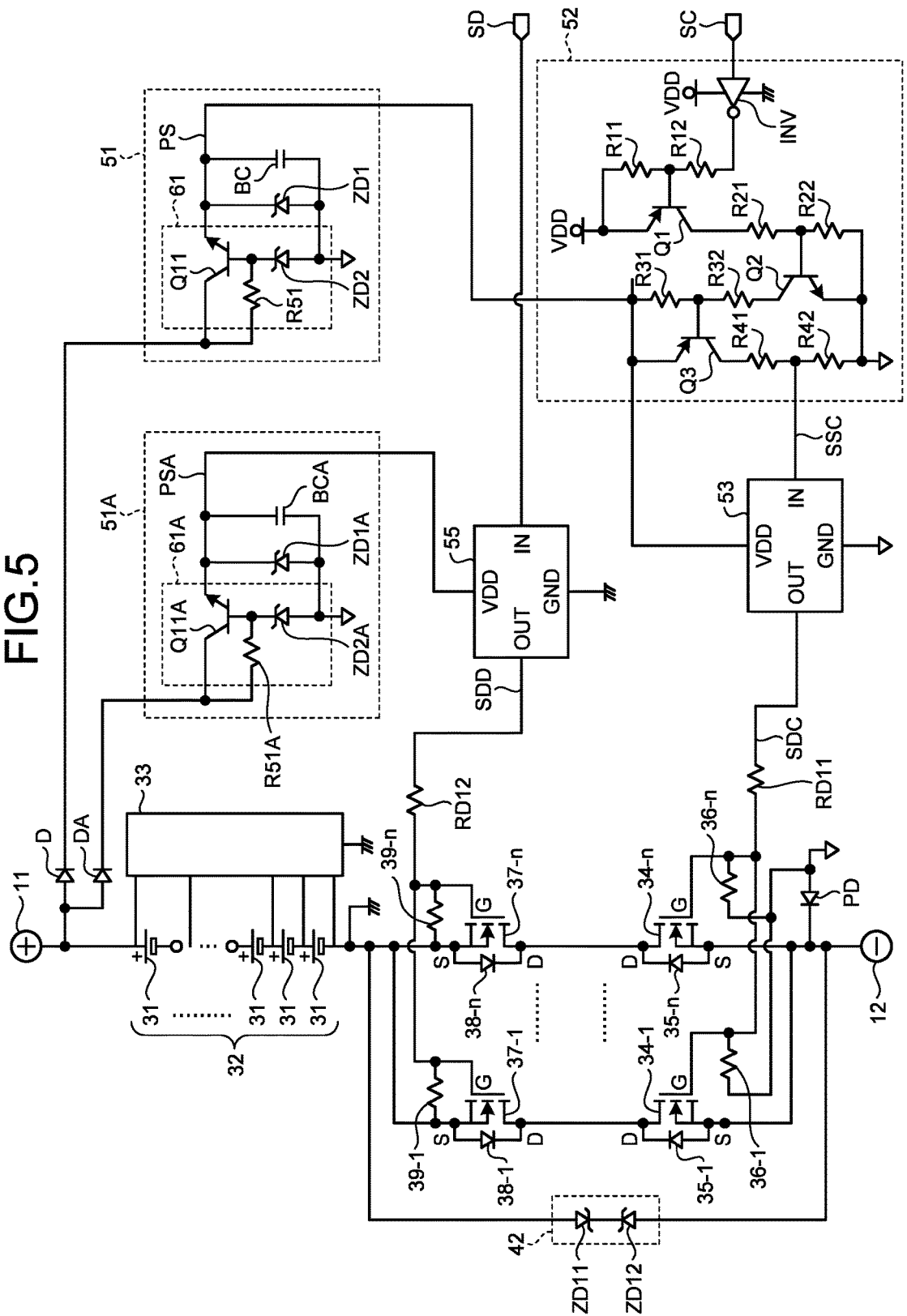
FIG. 5 is a detailed circuit explanatory diagram according to the second embodiment.

FIG. 5 is a detailed circuit explanatory diagram according to the second embodiment.

As illustrated in FIG. 5, the constant voltage circuit 51 broadly includes the constant voltage generator 61 that generates the constant voltage power supply based on the source potential level of the FET 34, the Zener diode ZD1 that is connected in parallel with the constant voltage generator 61 and clamps the output voltage of the constant voltage generator 61 to the desired constant voltage, and the bypass capacitor BC that is connected in parallel with the Zener diode ZD1 and performs relaxation of the voltage fluctuations caused by the source potential fluctuations and relaxation of the voltage fluctuations at the time of gate signal switching.

The constant voltage generator 61 includes the transistor Q11 the collector terminal of which is connected to the high potential side of the storage battery unit 32 via the diode D and that is configured as the emitter follower (collector-grounded) circuit by the resistor R51 and the Zener diode ZD2 the cathode terminal of which is connected to the base terminal of the transistor Q11, the anode terminal of which is at the source potential level, and that stabilizes the base voltage of the transistor Q11.

With the above configuration, the constant voltage power supply PS based on the source potential level generated by the constant voltage circuit 51 is supplied to the level shift circuit 52.

The constant voltage circuit 51A broadly includes a constant voltage generator 61A that generates a constant voltage power supply based on the power supply potential level, a Zener diode ZD1A that is connected in parallel with the constant voltage generator 61A and clamps an output voltage of the constant voltage generator 61A to a desired constant voltage, and a bypass capacitor BCA that is connected in parallel with the Zener diode ZD1A and performs relaxation of voltage fluctuations caused by source potential fluctuations and relaxation of voltage fluctuations at the time of gate signal switching.

The constant voltage generator 61A includes a transistor Q11A the collector terminal of which is connected to the high potential side of the storage battery unit 32 via a diode DA and that is configured as an emitter follower (collector-grounded) circuit by a resistor R51A and a Zener diode ZD2A the cathode terminal of which is connected to a base terminal of the transistor Q11A, the anode terminal of which is at the source potential level, and that stabilizes a base voltage of the transistor Q11A.

With the above configuration, a constant voltage power supply PSA based on the power supply potential level generated by the constant voltage circuit 51A is supplied to the FET driver 55.

The following describes the level shift circuit 52.

The level shift circuit 52 includes the inverter INV that receives the charge control signal SC based on the power supply potential level via the input terminal and inverts and outputs the charge control signal SC, the resistors R11 and R12 that, when the charge control signal SC (="H") that instructs charging is input to the inverter INV and when the output of the inverter INV becomes the "L" level (ground level), function as the voltage dividing circuit that divides the voltage of the high potential side power supply VDD, the transistor Q1 that is turned on by the application of the voltage of the high potential side power supply VDD divided by the resistors R11 and R12 to the base terminal thereof, and the resistors R21 and R22 that, when the transistor Q1 is turned on, function as a voltage dividing circuit that divides the voltage of a high potential side power supply VDD at the certain voltage division ratio.

In this case, the high potential side power supply VDD is generated based on the power supplied from the storage battery unit 32 by the constant voltage power supply circuit (not illustrated). The voltage of the high potential side power supply VDD is 3.3 [V], for example.

The level shift circuit 52 further includes the transistor Q2 that is turned on by the application of the voltage of the high potential side power supply VDD divided by the resistors R21 and R22 to the base terminal thereof, the resistors R31 and R32 that, when the transistor Q2 is turned on, function as the voltage dividing circuit that divides the voltage of the constant voltage power supply PS supplied from the constant voltage circuit 51 at the certain voltage division ratio, the transistor Q3 that is turned on by the application of the voltage of the constant voltage power supply PS divided by the resistors R31 and R32 to the base terminal thereof, and the resistors R41 and R42 that, when the transistor Q3 is turned on, function as the voltage dividing circuit that divides the voltage of the constant voltage power supply PS supplied from the constant voltage circuit 51 at the certain voltage division ratio and outputs the divided voltage of the constant voltage power supply PS as the charge control signal SSC.

In the FET driver 53, the charge control signal SSC is input to an input terminal IN from the level shift circuit 52, and the charge drive control signal SDC based on the source potential level of the FETs 34-1 to 34-$n$ is output from an output terminal OUT to the charge control FETs 34-1 to 34-$n$ via a damping resistor RD11 that prevents vibration of this charge drive control signal (FET gate signal) SDC.

Similarly, In the FET driver 55, the discharge control signal SD based on the power supply potential level is input to an input terminal IN from the control circuit 41, and the discharge drive control signal SDD based on the power supply potential level is output from an output terminal OUT to the discharge control FETs 37-1 to 37-$n$ via a damping resistor RD12 that prevents vibration of this discharge drive control signal (FET gate signal) SDD.

Connected to the low potential side of the storage battery unit 32 are n discharge control FETs (discharge control N-channel MOSFETs) 37-1 to 37-$n$ the source terminals of which are connected to each other, the diodes 38-1 to 38-$n$ that are the parasitic diodes present in between the respective drain terminals and the respective source terminals of the discharge control FETs 37-1 to 37-$n$, and the operation stabilizing resistors 39-1 to 39-$n$ that are connected to between the respective source terminals and the respective gate terminals of the discharge control FETs 37-1 to 37-$n$ and stabilize the potential difference levels between the respective source terminals and the respective gate terminals of the discharge control FETs 37-1 to 37-$n$ to stabilize the operation of the discharge control FETs 37-1 to 37-$n$.

Connected to the respective discharge control FETs 37-1 to 37-$n$ are the charge control FETs (charge control N-channel MOSFETs) 34-1 to 34-$n$ the drain terminals of which are connected to the drain terminals of the discharge control FETs 37-1 to 37-$n$, the diodes 35-1 to 35-$n$ that are the parasitic diodes present in between the respective drain terminals and the respective source terminals of the charge control FETs 34-1 to 34-$n$, and the operation stabilizing resistors 36-1 to 36-$n$ that are connected to between the respective source terminals and the respective gate terminals of the charge control FETs 34-1 to 34-$n$ via the protective diode PD that protects the circuit from a reverse voltage from the low potential side power supply terminal 12 and stabilize the potential difference levels between the respective source terminals and the respective gate terminals of the charge control FETs 34-1 to **34-*n* to stabilize the operation of the charge control FETs 34-1 to 34-*n***.

The snubber circuit 42 includes the TVS diode ZD11 and the TVS diode ZD12 the anode terminals of which are commonly connected and that are connected in series to function as the surge absorbing diodes in order to prevent the overvoltage in both directions of the current during charging and the current during discharging. Although the TVS diodes are used as the surge absorbing diodes in the present embodiment, normal Zener diodes, other overvoltage protection elements, or an overvoltage protection circuit can also be used.

The following describes the operation of the second embodiment.

In the second embodiment, the drain terminals are back-to-back connected, and in order to explain that a problem similar to that in a conventional case does not occur, the following describes operation during discharging.

First, the constant voltage power supply PSA based on the power supply potential level generated by the constant voltage circuit 51A is supplied to the FET driver 55.

When performing discharging concurrently therewith, the discharge control signal SD of the "H" level based on the power supply potential level is input to an input terminal IN of the FET driver 55 by the control circuit 41.

As a result of this operation, the discharge drive control signal SDD of the "H" level based on the source potential level is output from an output terminal OUT of the FET driver 55.

As a result of this operation, the discharge control FETs 37-1 to **37-*n* are successively turned on, and discharging (power supply) is performed from the storage battery unit 32** to a load (not illustrated).

During discharging, when an abnormal voltage is detected by the cell voltage monitor circuit 33 that monitors the voltages of the respective storage battery cells 31 included in the storage battery unit 32, the fact is reported to the control circuit 41, and the discharge control signal SD of the "L" level based on the power supply potential level is input to the input terminal IN of the FET driver 55 by the control circuit 41.

As a result of this operation, the discharge drive control signal SDD of the "L" level based on the source potential level is output from the output terminal OUT of the FET driver 55.

As a result of this operation, the discharge control FETs 37-1 to **37-*n* are successively turned off, and discharging (power supply) is interrupted from the storage battery unit 32** to the load (not illustrated).

In this situation, although a negative reverse potential and a positive reverse potential are generated at the high potential side power supply terminal 11 and at the low potential side power supply terminal 12, respectively, caused by a counter electromotive force due to the interruption of a discharging current, the protective diode PD prevents the reverse voltage from being applied, whereby a circuit failure of the FET driver 53 can be prevented.

During charging, when an overvoltage is detected by the cell voltage monitor circuit 33 that monitors the voltages of the respective storage battery cells 31 included in the storage battery unit 32, the fact is reported to the control circuit 41, and the charge control signal SC of the "L" level based on the power supply potential level is input to the input terminal of the level shift circuit 52 by the control circuit 41.

As a result of this operation, the inverter INV of the level shift circuit 52 inverts the charge control signal SC to output the signal of the "H" level.

When the charge control signal SC becomes the "H" level, the transistor Q1 is turned off, and subsequently, the transistor Q2 and the transistor Q3 are turned off.

When the transistor Q3 is turned off, the level shift circuit 52 generates the charge control signal SSC of the "L" level based on the source potential level of the FETs 34-1 to **34-*n* and outputs the charge control signal SSC to the input terminal IN of the FET driver 53, and the charge drive control signal SDC of the "L" level based on the source potential level is output from the output terminal OUT of the FET driver 53**.

Consequently, the charge control FETs 34-1 to **34-*n* are successively turned off, all the charge control FETs 34-1 to 34-*n* are turned off, a closed circuit for charging is interrupted, charging is stopped, and the storage battery unit 32 including the storage battery cells 31** is protected from overcharge.

In this situation, although a positive overvoltage and a negative overvoltage are generated at the high potential side power supply terminal 11 and at the low potential side power supply terminal 12, respectively, caused by a counter electromotive force due to the interruption of the charging current, the level shift circuit 52 and the FET driver 53 are protected by the constant voltage circuit 51 based on the source potential level of the FETs 34-1 to **34-*n***.

[3] Modification of Embodiment

A control program executed by the battery module or the battery pack system of the present embodiment may be embedded and provided in a ROM, for example.

The control program executed by the battery module or the battery pack system of the present embodiment may be recorded and provided in a computer-readable recording medium such as a compact disc read only memory (CD-ROM), a flexible disk (FD), a compact disc recordable (CD-R), and a digital versatile disc (DVD), as an installable or executable file.

The control program executed by the battery module or the battery pack system of the present embodiment may be stored in a computer connected to a network such as the Internet and provided by being downloaded via the network. Furthermore, the control program executed by the battery module or the battery pack system of the present embodiment may be provided or distributed via a network such as the Internet.

While the foregoing describes the embodiments of the present invention, these embodiments are presented as examples and do not intend to limit the scope of the invention. These novel embodiments can be performed in various other forms, and various omissions, replacements, and changes can be made without departing from the essence of the invention. These embodiments and modifications thereof are included in the scope and essence of the invention and are included in the inventions described in the claims and equivalents thereof.

What is claimed is:

1. A storage battery device comprising:
   a battery group that includes a plurality of battery cells connected in series;
   a charge-and-discharge control FET unit that is connected to a low potential side of the battery group and includes a first pair of N-channel MOSFETs and a second pair of N-channel MOSFETs, wherein:
   the first pair of N-channel MOSFETs is connected in parallel with the second pair of N-channel MOSFETs;

each of the first pair of N-channel MOSFETs and the second pair of N-channel MOSFETs has a pair of source terminals which are back-to-back connected; and the pair of back-to-back connected source terminals of the first pair of N-channel MOSFETs and the pair of back-to-back connected source terminals of the second pair of N-channel MOSFETs are connected to each other; and a drive controller that generates a drive control signal based on a potential level of the source terminals and outputs the drive control signal to a gate terminal of each of the N channel MOSFETs of the charge-and-discharge control FET unit, the drive controller comprising:

a constant voltage circuit that uses a power supply from the battery group to generate a constant voltage based on the potential level of the source terminals to supply a constant voltage power supply; and a level shifter that operates with the constant voltage power supply, performs a level shift on a discharge control signal or a charge control signal that has a signal level based on a potential level of the power supply from the battery group, and outputs a discharge control signal or a charge control signal that has a signal level based on the potential level of the source terminals.

2. The storage battery device according to claim 1, wherein the level shifter comprises:

a first level shift circuit that operates with the constant voltage power supply, performs the level shift on the discharge control signal that has the signal level based on the power supply potential level, and outputs the discharge control signal that has the signal level based on the potential level of the source terminals, and a second level shift circuit that operates with the constant voltage power supply, performs the level shift on the charge control signal that has the signal level based on the power supply potential level, and outputs the charge control signal that has the signal level based on the potential level of the source terminals.

3. The storage battery device according to claim 2, wherein the drive controller further comprises:

a first FET driver that operates with the constant voltage power supply, generates a discharge drive control signal based on the potential level of the source terminals in accordance with the discharge control signal output by the first level shift circuit, and outputs the generated discharge drive control signal to an N-channel MOSFET to be discharge-controlled out of the pairs of N-channel MOSFETs, and a second FET driver that operates with the constant voltage power supply, generates a charge drive control signal based on the potential level of the source terminals in accordance with the charge control signal output by the second level shift circuit, and outputs the generated charge drive control signal to an N-channel MOSFET to be discharge-controlled out of the pairs of N-channel MOSFETs.

4. The storage battery device according to claim 1, wherein the charge-and-discharge control FET unit functions as an interruption circuit that interrupts the battery group from a main circuit.

* * * * *